(12) United States Patent
Asano

(10) Patent No.: US 7,043,093 B2
(45) Date of Patent: May 9, 2006

(54) PROGRAM FOR PROCESSING IMAGE, RECORDING MEDIUM OF THE PROGRAM AND METHOD OF AND APPARATUS FOR PROCESSING IMAGE

(75) Inventor: Motohiro Asano, Osaka (JP)

(73) Assignee: Minolta Co., Ltd., Osaka (JP)

( * ) Notice: Subject to any disclaimer, the term of this patent is extended or adjusted under 35 U.S.C. 154(b) by 555 days.

(21) Appl. No.: 10/215,186

(22) Filed: Aug. 9, 2002

(65) Prior Publication Data

US 2003/0067546 A1   Apr. 10, 2003

(30) Foreign Application Priority Data

Aug. 10, 2001  (JP) ............................. 2001-243915

(51) Int. Cl.
*G06K 9/40* (2006.01)
(52) U.S. Cl. ...................... 382/274; 348/631; 348/645; 348/673; 348/683; 348/699; 348/910
(58) Field of Classification Search ................ 382/274; 348/226.1, 223.1, 631, 645, 673, 678, 683, 348/699, 910, 447
See application file for complete search history.

(56) References Cited

U.S. PATENT DOCUMENTS

| | | | | |
|---|---|---|---|---|
| 4,670,787 A | * | 6/1987 | Levine | 348/602 |
| 5,432,566 A | * | 7/1995 | Tanaka et al. | 348/687 |
| 6,147,706 A | * | 11/2000 | Inuiya et al. | 348/226.1 |
| 6,320,906 B1 | * | 11/2001 | Toyokura et al. | 348/699 |
| 6,519,002 B1 | * | 2/2003 | Tomaszewski | 348/226.1 |
| 6,710,818 B1 | * | 3/2004 | Kasahara et al. | 348/607 |

FOREIGN PATENT DOCUMENTS

JP   08-154188   6/1996
JP   2000-324365   11/2000

* cited by examiner

*Primary Examiner*—Kanjibhai Patel
*Assistant Examiner*—Manav Seth
(74) *Attorney, Agent, or Firm*—Morrison & Foerster LLP

(57) ABSTRACT

At first, average brightness of each of frames of a moving image is calculated by a computer. Following that, a moving average along a time axis is calculated for each of the frames so that moving average brightness is generated as a reference data of brightness. Next, difference data between the average brightness and the moving average brightness are generated. Further, the difference data are grouped based on the signs of the reference data. Then, on the basis of the grouped difference data, it is judged whether an unwanted change of brightness is present. Thus, it is automatically and precisely judged whether the unwanted change of brightness such as a flicker is present in the moving image.

11 Claims, 10 Drawing Sheets

SOLID LINE: AVERAGE
BRIGHTNESS $L_i$ OF
EACH FRAME

BROKEN LINE: MOVING AVERAGE $L_i'$
OF AVERAGE BRIGHTNESS $L_i$ ALONG
TIME AXIS

US 7,043,093 B2

PROGRAM FOR PROCESSING IMAGE, RECORDING MEDIUM OF THE PROGRAM AND METHOD OF AND APPARATUS FOR PROCESSING IMAGE

This application is based on the application No. 2001-243915 filed in Japan, the contents of which are hereby incorporated by reference.

BACKGROUND OF THE INVENTION

1. Field of the Invention

The present invention relates to a program of a computer for processing an image, which can precisely judge whether a flicker or the like is present or can precisely correct image data, in order to respond to a unwanted change of brightness or chroma such as a flicker thereof. The present invention further relates to a recording medium in which the program has been stored, and to a method of and an apparatus for processing the images.

2. Description of the Prior Art

In general, a moving image, which is taken in a circumstance illuminated by a lighting equipment such as a fluorescent lamp or the like by using a digital camera or the like, may have an unwanted change of brightness or chroma such as a flicker or the like, depending on the condition in which the moving image is taken. The term of "flicker" means such an undesirable phenomenon that the brightness or chroma of the moving image periodically changes because the frequency of the change of the illuminating property of the lighting equipment is not synchronized with the frame rate of the moving image. Hereupon, the term of "unwanted" does not mean "merely unnecessary", but means also "undesirable" or "to be removed".

For example, in the Japanese Laid-open Patent Publication No. 2000-324365, there is disclosed an apparatus for processing an image, which corrects a moving image on the basis of image data of past several frames to prevent or restrain occurrence of a flicker.

However, the conventional process for preventing or restraining the flicker, for example disclosed in the Japanese Laid-open Patent Publication No. 2000-324365, has such a problem that the accuracy of the image correction for judging whether the flicker exists or for eliminating the flicker.

Meanwhile, in the case that the moving image has an unwanted change of brightness or chroma due to other causes in addition to the flicker, for example in the case that the brightness or chroma wobbles with a longer period due to an improper automatic exposure of a digital camera or the like, the change of the brightness or chroma may have a plurality of overlaid changing patterns. However, according to the conventional process for preventing or restraining the flicker, there may occur such a problem that the unwanted change of brightness or chroma can not be effectively prevented or restrained in the above-mentioned case.

SUMMARY OF THE INVENTION

The present invention, which has been developed to solve the conventional problems described above, has an object to provide a means which can automatically and precisely judge whether an unwanted change of brightness or chroma such as a flicker is present in a moving image or can judge the condition of the change. Further, the present invention has another object to provide a means which can automatically and effectively prevent or restrain that the unwanted change of brightness or chroma occurs in the moving image.

A program for processing a moving image according to one aspect of the present invention, which has been developed to achieve the above-mentioned object, is characterized in that it makes a computer execute the following steps.

(1) A step of inputting the moving image (hereinafter referred to as "moving image inputting step").

(2) A step of generating a reference data about brightness or chroma based on an image data about brightness or chroma of the moving image (hereinafter referred to as "reference data generating step").

(3) A step of determining that the moving image has an unwanted change of brightness or chroma (for example, flicker) when the image data has a predetermined change of brightness or chroma in relation to the reference data (hereinafter referred to as "change judging step").

When the program for processing the moving image is executed by the computer, it can be automatically and precisely judged whether an unwanted change of brightness or chroma such as a flicker is present in the moving image or the condition of the change can be automatically and precisely judged. The present invention also includes a recording medium which stores the above-mentioned program.

Another program for processing the moving image according to another aspect of the present invention is characterized in that it makes the computer execute the following steps.

(1) The moving image inputting step.

(2) The reference data generating step.

(3) A step of performing data correction for the moving image when the image data has a predetermined change of brightness or chroma in relation to the reference data, wherein the data correction is performed so as to reduce the change (hereinafter referred to as "data correcting step").

When the program for processing the moving image is executed by the computer, it can be automatically and effectively prevented or restrained that the unwanted change of brightness or chroma occurs in the moving image. The present invention also includes a recording medium which stores the above-mentioned program.

A method of processing the moving image is characterized in that it includes the moving image inputting step, the reference data generating step and the change judging step. According to the method, it can be automatically and precisely judged whether an unwanted change of brightness or chroma such as a flicker is present in the moving image or the condition of the change can be automatically and precisely judged. Another method of processing the moving image is characterized in that it includes the moving image inputting step, the reference data generating step and the data correcting step. According to the method, it can be automatically and effectively prevented or restrained that the unwanted change of brightness or chroma occurs in the moving image.

An apparatus for processing the moving image is characterized in that it includes the following members.

(1) An input device for inputting the moving image.

(2) A reference data generator for generating a reference data about brightness or chroma based on an image data about brightness or chroma of the moving image.

(3) A judging device for determining that the moving image has an unwanted change of brightness or chroma when the image data has a predetermined change of brightness or chroma in relation to the reference data. According to the apparatus, it can be automatically and precisely judged whether an unwanted change of brightness or chroma such as a flicker exists in the moving image or the condition of the change can be automatically and precisely judged.

Another apparatus for processing the moving image is characterized in that it includes the following members.

(1) The input device.
(2) The reference data generator.
(3) A data corrector for performing data correction for the moving image when the image data has a predetermined change of brightness or chroma in relation to the reference data, wherein the data correction is performed so as to reduce the change. According to the apparatus, it can be automatically and effectively prevented or restrained that the unwanted change of brightness or chroma occurs in the moving image.

BRIEF DESCRIPTION OF THE DRAWINGS

Various characteristics and advantages of the present invention will become clear from the following description taken in conjunction with the preferred embodiments with reference to the accompanying drawings throughout which like parts are designated by like reference numerals, in which.

DETAILED DESCRIPTION OF THE PREFERRED EMBODIMENTS

Hereinafter, several preferred embodiments of the present invention will be concretely described. In each of the embodiments, it is judged whether an unwanted change of brightness such as a flicker is present, the condition of the change is judged, or the brightness is corrected. However, by means of a process similar to the process for the brightness, it may be judged whether an unwanted change of chroma is present, the condition of the change may be judged, or the chroma may be corrected. In each of the embodiments, the hardware structure is substantially identical to one another while the software is different from one another. Therefore, at first, the hardware construction of an apparatus for processing a moving image of an embodiment according to the present invention, which is common with the embodiments, will be described.

Figure 14:
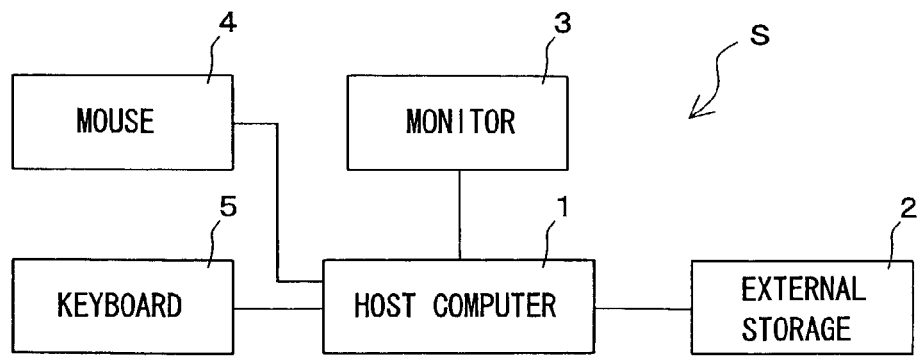
FIG. 14 is a block diagram showing a rough construction of an image processor according to the present invention.

As shown in FIG. 14, an image processor S of an embodiment according to the present invention is provided with a host computer 1 (hereinafter referred to as "computer 1" for short), which judges whether an unwanted change of brightness such as a flicker is present in a moving image, judges the condition of the change, or performs various data processing to correct the brightness. To the computer 1, there are connected an external storage 2 for storing various data, a monitor 3 for displaying various information on its display, and a mouse 4 and a keyboard 5 which are used to operate the computer 1 by a user (operator).

Figure 15:
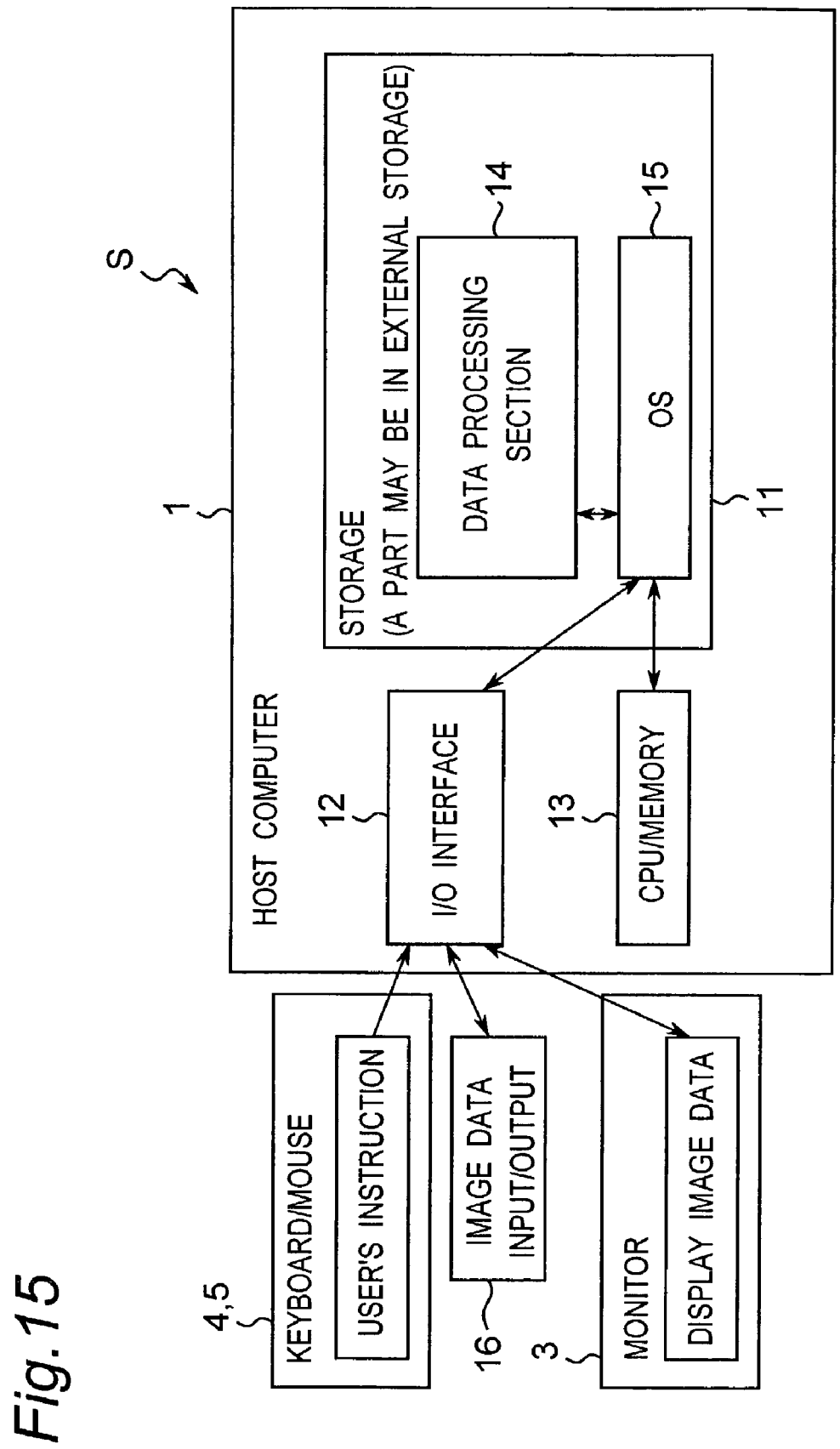
FIG. 15 is a block diagram showing a more detailed construction of the image processor shown in FIG. 14.

As shown in FIG. 15, the computer 1 is provided with a storage 11, an I/O interface 12 (i.e. input-output interface) and a CPU/memory 13. The storage 11, in which a software (i.e. programs for the computer 1) is stored, has a data processing section 14 which stores a program for executing the after-mentioned data processing, and an OS section 15 acting as a region which stores an OS and is used by the OS. Each of the monitor 3, the mouse 4 and the keyboard 5 is connected to the I/O interface 12. An image data I/O section 16 (image data input-output section) is also connected to the I/O interface 12.

Hereinafter, each of the embodiments will be concretely described.

(Embodiment 1)

Figure 1:
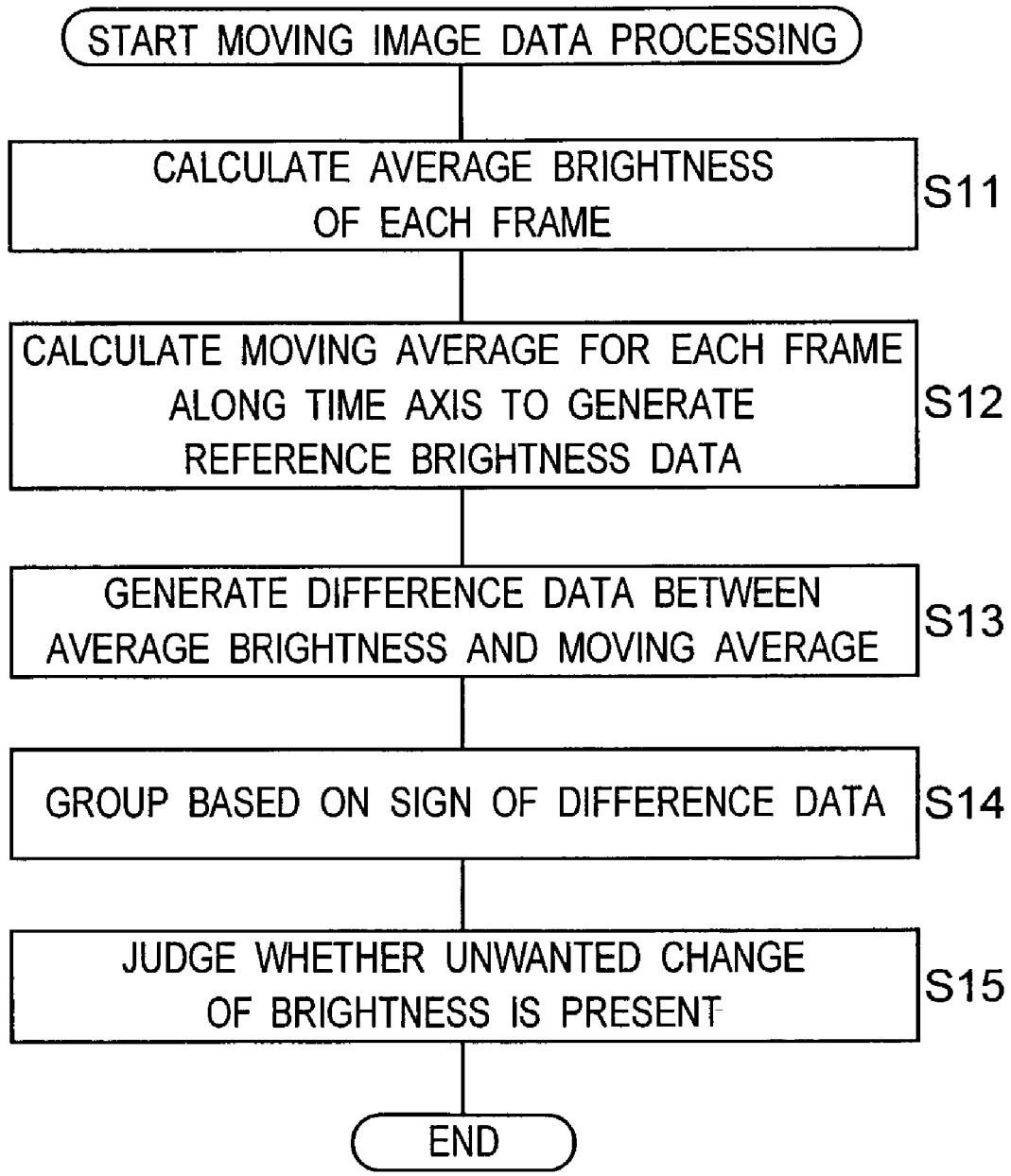
FIG. 1 is a flowchart showing a process for judging an unwanted change of brightness according to Embodiment 1 of the present invention.

In Embodiment 1, a reference data of brightness is automatically generated and then it is automatically judged whether an unwanted change of brightness is present, or the condition of the change is judged, in accordance with the data processing procedure shown by the flowchart in FIG. 1, using the image processor S shown in FIGS. 14 and 15. The program of the data processing procedure shown by the flowchart is stored in the external storage 2 (recording medium) or the storage 11 of the computer 1 (being true of Embodiments 2 to 5 also).

Hereinafter, the procedure for processing the data or image according to Embodiment 1 will be described with reference to the flowchart shown in FIG. 1. When a moving image is inputted from the image data I/O section 16 to the computer 1, the computer 1 starts to process the moving image data. At first, average brightness $L_i$ of each of frames is calculated (Step S11). The subscript "i" indicates a frame number. The data processing may be sped up, for example, by sampling the data every two pixels.

Following that, the computer 1 calculates a moving average along the time axis about average brightness $L_1$ of each of the frames to generate a reference data of brightness (Step S12). For example, the moving average is calculated in accordance with Equation 1 described below, using one frame (its subscript being i), the preceding n frames and the following n frames. That is, the reference brightness $L'_i$ indicates the average brightness of each of the frames after the moving average has been calculated (hereinafter referred to as "moving average brightness $L'_i$").

$$L'_1 = \{L_{1-n} + L_{1-(n-1)} + \ldots + L_{1-1} + L_1 + L_{i+1} + \ldots + L_{i+(n-1)} + L_{1+n}\}/(2n+1) \quad \text{Equation 1}$$

When the moving average brightness $L'_i$ is calculated using Equation 1 about the first frame or the frame near the first frame, or the last frame or the frame near the last frame, in a series of frames, it is probable that the preceding or following n frames, which are to be used for the above-mentioned calculation, do not exist. In this case, the frame is removed from the objects for calculating the moving average.

Figure 6:
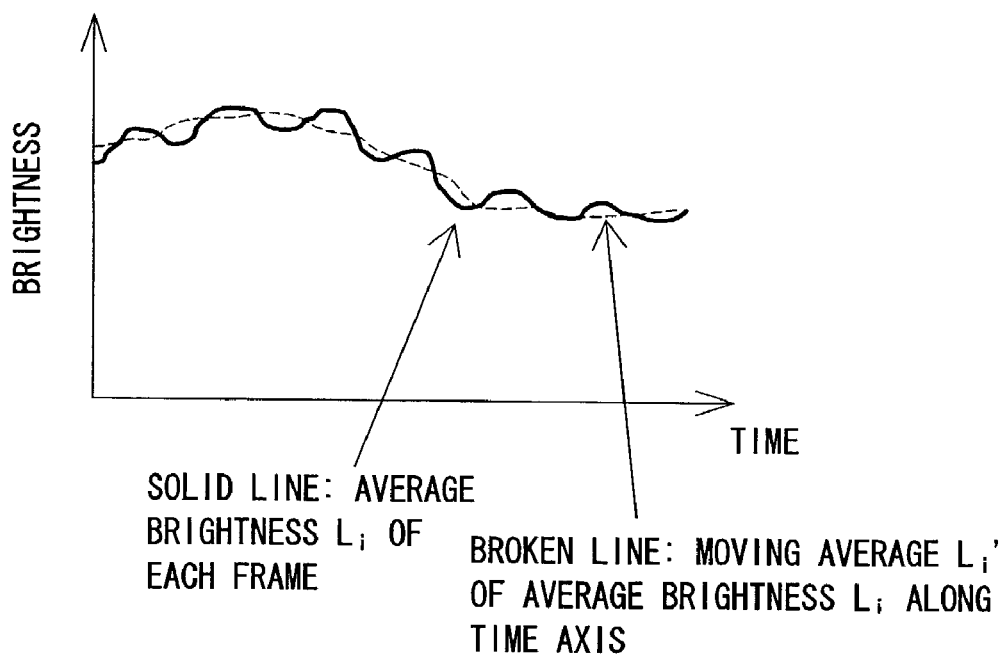
FIG. 6 is a graph showing an example of the characteristics of the change of average brightness and moving average brightness in relation to the elapsed time.

FIG. 6 shows the change of the average brightness $L_1$ at every frame with the lapse of time (solid line) and the change of the moving average brightness $L'_1$ with the lapse of time, which is calculated using Equation 1 (broken line). As apparent from FIG. 6, the moving average brightness $L'_1$ is averaged or smoothed.

Next, the computer 1 calculates the difference $D_1$ between the average brightness $L_1$ and the moving average brightness $L'_1$ about each of the frames (hereinafter referred to as "brightness difference $D_i$") using Equation 2 described below to generate difference data (Step S13).

$$D_1 = L_1 - L'_1 \quad \text{Equation 2}$$

Figure 7:
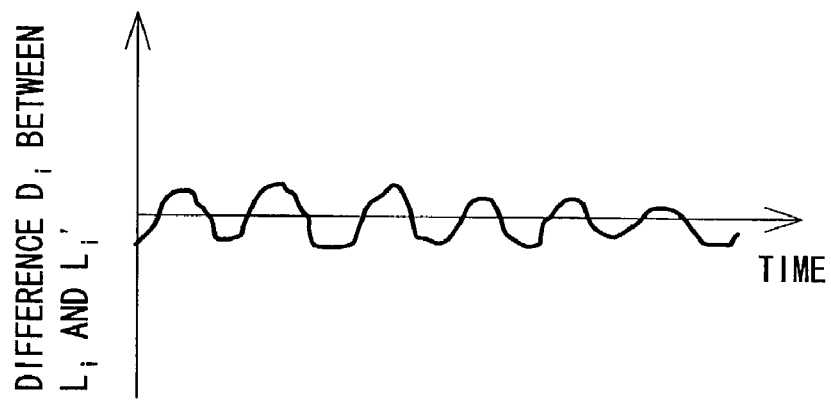
FIG. 7 is a graph showing an example of the characteristics of the change of differences between average brightness and moving average brightness in relation to the elapsed time.

FIG. 7 shows an example of the change of the brightness difference $D_i$ with the lapse of time. As apparent from FIG. 7, the brightness difference $D_1$ periodically changes with the lapse of time in the example. That is, an unwanted change of brightness is present.

After that, the computer 1 extracts the data corresponding to the unwanted change of brightness from a series of brightness difference data. That is, the computer 1 groups the data of the brightness difference $D_i$ based on their signs (Step S14), and then judges whether an unwanted change of brightness is present, or judges the condition of the change (Step S15). To be more precise, the computer 1 detects (or checks) periodicity of the brightness difference $D_1$, and then determines that an unwanted change of brightness is present if the periodicity is present.

Hereinafter, with reference to Tables 1 to 4, as to the case that the data of the brightness difference $D_1$ shown in Table 1 or 3 are obtained, the process for judging periodicity of the unwanted change of brightness will be described. That is, at first, the sign of one brightness difference $D_i$ and the sign of the next brightness difference $D_{i+1}$ are compared with each other. Hereupon, the number (i+1) of a frame, at which the sign changes from minus or zero to plus, is extracted (checked) by turns. Thus, the brightness difference data of the primarily extracted frames are grouped as the first group. Further, the brightness difference data of the frame next to each of the primarily extracted frames (but before the next primarily extracted frame) is extracted by turns. Thus, the brightness difference data of the secondarily extracted frames are grouped as the second group. Similarly, the third, fourth . . . groups are obtained. Then, the number of the members in every group and the average of the brightness difference in every group are calculated.

Tables 2 and 4 are obtained by grouping the brightness difference data in Tables 1 and 3 in accordance with the procedure described above, respectively. For example, in Table 2, the brightness difference data of the frame 2, which has been extracted at first from the data in Table 1, belongs to the first group. The brightness difference data of the following frames 3 and 4 belong to the second and third groups, respectively. In this case, there is no frame which should belong to the fourth or fifth group. Therefore, no data is described in the columns for the fourth and fifth groups (described as "none").

TABLE 1

Brightness difference data with integral periodicity

| Frame number i | $D_i$ | Frame with changed sign |
|---|---|---|
| 1 | −1 | |
| 2 | 4 | Yes (Extracted) |
| 3 | −1 | |
| 4 | −2 | |
| 5 | 5 | Yes (Extracted) |
| 6 | −2 | |
| 7 | −3 | |
| 8 | 6 | Yes (Extracted) |
| 9 | −2 | |
| 10 | −4 | |
| 11 | 7 | Yes (Extracted) |
| 12 | −2 | |
| 13 | −4 | |
| 14 | 8 | Yes (Extracted) |
| 15 | −2 | |
| 16 | −5 | |

TABLE 2

Grouping of brightness difference data in Table 1

| | 1st group | 2nd group | 3rd group | 4th group | 5th group |
|---|---|---|---|---|---|
| 1st cycle | −1 | None | None | None | None |
| 2nd cycle | 4 | −1 | −2 | None | None |
| 3rd cycle | 5 | −2 | −3 | None | None |
| 4th cycle | 6 | −2 | −4 | None | None |
| 5th cycle | 7 | −2 | −4 | None | None |
| 6th cycle | 8 | −2 | −5 | None | None |
| Membership | 5 | 5 | 5 | 0 | 0 |
| Average | 6 | −1.8 | −3.6 | — | — |

(Remarks) The calculation for the 1st cycle may be omitted because the data would not be suitably grouped. It is omitted in the above example.

TABLE 3

Brightness difference data with decimal periodicity

| Frame number i | $D_i$ | Frame with changed sign |
|---|---|---|
| 1 | −1 | |
| 2 | 4 | Yes (Extracted) |
| 3 | 1 | |
| 4 | −2 | |

TABLE 3-continued

Brightness difference data with decimal periodicity

| Frame number i | $D_i$ | Frame with changed sign |
|---|---|---|
| 5 | −1 | |
| 6 | 5 | Yes (Extracted) |
| 7 | 2 | |
| 8 | −3 | |
| 9 | 6 | Yes (Extracted) |
| 10 | 2 | |
| 11 | −4 | |
| 12 | 7 | Yes (Extracted) |
| 13 | 2 | |
| 14 | −4 | |
| 15 | −2 | |
| 16 | 8 | Yes (Extracted) |
| 17 | 2 | |
| 18 | −5 | |
| 19 | 7 | Yes (Extracted) |
| 20 | 1 | |
| 21 | −4 | |

TABLE 4

Grouping of brightness difference data in Table 3

| | 1st group | 2nd group | 3rd group | 4th group | 5th group |
|---|---|---|---|---|---|
| 1st cycle | −1 | None | None | None | None |
| 2nd cycle | 4 | 1 | −2 | −1 | None |
| 3rd cycle | 5 | 2 | −3 | None | None |
| 4th cycle | 6 | 2 | −4 | None | None |
| 5th cycle | 7 | 2 | −4 | −2 | None |
| 6th cycle | 8 | 2 | −5 | None | None |
| 7th cycle | 7 | 1 | −4 | None | None |
| Membership | 6 | 6 | 6 | 2 | 0 |
| Average | 6.17 | 1.67 | −3.67 | −1.5 | — |

(Remarks) The calculation for the 1st cycle may be omitted because the data would not be suitably grouped. It is omitted in the above example.

If as against the membership (i.e. number of members) of a certain group in Table 2 or 4, the membership of the group after next (i.e. next and next group) drastically decreases (for example, third group and fifth group in the case of Table 4), it is judged that periodicity may be present.

To be more precise, for example, a first threshold Th1 and a second threshold Th2 are set based on the membership of the first group (for example, 6 in the case of Table 4). For example, the first threshold Th1 may be set to 80% of the membership (4.8 in the case of Table 4) while the second threshold Th2 may be set to 20% of the membership (1.2 in the case of Table 4). Then, a group whose membership is smaller than the first threshold Th1, is sought (the fourth group in the case of Table 4). If the membership of the group next to the sought group (the fifth group in the case of Table 4) is smaller than the second threshold Th2, it is judged the periodicity may be present.

In that case, the number of groups (in the case of Table 4, the first to third groups), in each of which its membership is larger than the first threshold Th1, is defined as the integral part of the periodicity (in the case of Table 4, 3). Meanwhile, the value, which is obtained by dividing the membership of the following group by the membership of the first group is defined as the decimal part of the periodicity (in the case of Table 4, 2/6=0.33). For example, in the case of Table 4, it is judged that periodicity of about 3.33 (3+0.33=3.33) may be present. That holds true with the case that the data may have integral periodicity. For example, in the case of Table 2, it is judged that periodicity of 3 may be present.

When it is judged that the data may have periodicity, it is determined that an unwanted change of brightness is present if the difference (in the case of Table 4, 9.84) between the maximum one (in the case of Table 4, 6.17) and the minimum one (in the case of Table 4, −3.67) in the average values of the groups (in the case Table 4, the first to third groups) corresponding to the integral part of the periodicity is larger than a third threshold Th3 (for example, 3).

Thus, the moving image may be processed using the computer 1 and the recording medium which stores the program for executing the procedure shown by the flowchart in FIG. 1. According to the apparatus for or method of processing the moving image in accordance with Embodiment 1, it can be automatically and precisely judged whether an unwanted change of brightness such as a flicker is present in the moving image or the condition of the change can be automatically and precisely judged.

(Embodiment 2)

Hereinafter, Embodiment 2 of the present invention will be described. In Embodiment 2, a reference data of brightness (moving average brightness) is automatically generated and then it is automatically and effectively prevented or restrained that an unwanted change of brightness such as a flicker occurs in the moving image, in accordance with the data processing procedure shown by the flowchart in FIG. 2, using the image processor S shown in FIGS. 14 and 15.

Figure 2:
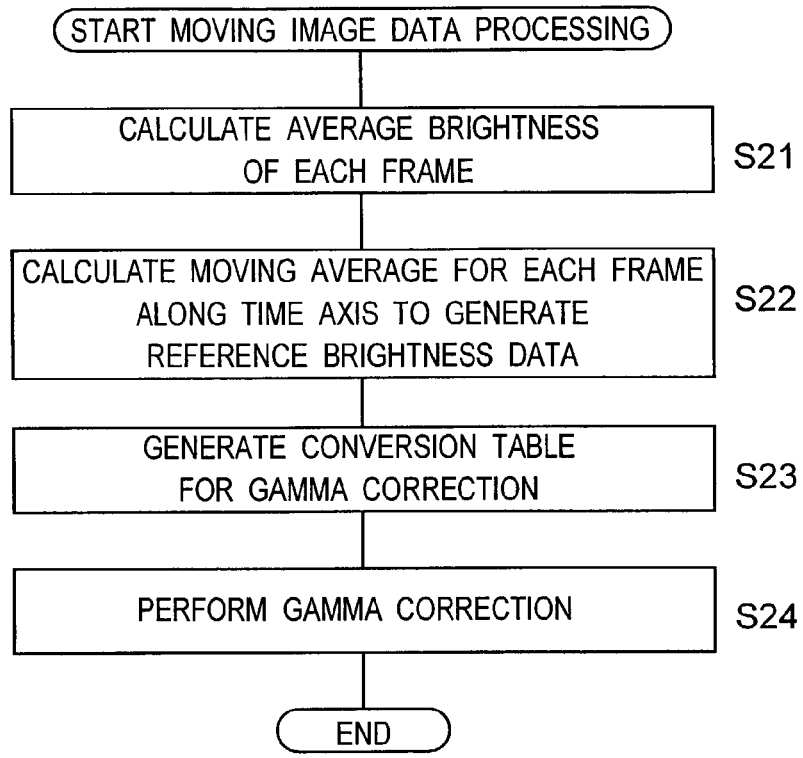
FIG. 2 is a flowchart showing a process for correcting brightness according to Embodiment 2 of the present invention.

Hereinafter, the data processing procedure according to Embodiment 2 will be described with reference to the flowchart shown in FIG. 2. Hereupon, the data processing procedure in Steps S21 and S22 of the flowchart shown in FIG. 2 is as same as the data processing procedure in Steps S11 and S12 of the flowchart shown in FIG. 1 (Embodiment 1), respectively. Therefore, in order to avoid duplicated descriptions, descriptions as to Steps S21 and S22 are omitted.

In Embodiment 2, the computer 1 generates reference brightness data (moving average brightness) in accordance with the procedure as same as the case of Embodiment 1, and then corrects the brightness so as to remove an unwanted change of brightness. That is, the computer 1 produces a gamma correction table, namely a conversion table for the gamma correction (Step S23), and then corrects the brightness data of the moving image (or moving image data) by means of the gamma correction using the gamma correction table (Step s24).

Figure 8:
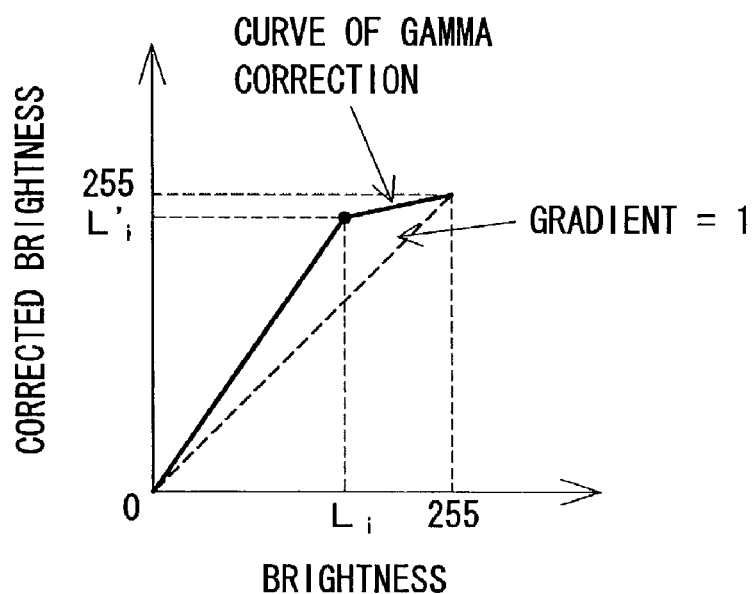
FIG. 8 is a graph showing the characteristics of the gamma correction of a gamma correction table.

The gamma correction table indicates the relationship between the actual brightness (axis of abscissa) and the corrected brightness (axis of ordinate), which has a gamma correction property or gamma correction graph (gamma correction curve), for example as shown in FIG. 8. The gamma correction for the brightness may be performed in accordance with the following procedure. At first, a first point indicating the actual brightness is set on the axis of abscissa (X-axis). Next, a second point, at which a straight line extending upward from the first point crosses the gamma correction graph, is obtained. Then, a third point, at which a straight line extending leftward from the second point crosses the axis of ordinate (Y-axis), is obtained. Thus, the value on the Y-axis corresponding to the third point is defied as the corrected brightness.

As apparent from FIG. 8, the gamma correction graph is a polygonal line which connects the three points (0,0), $(L_i,L_i')$ and (255,255) with two straight lines. At the point (0,0), both of the actual brightness and the corrected brightness are 0 (minimum brightness). At the point $(L_1,L_1')$, the actual brightness is the average brightness $L_i$ while the corrected brightness is the moving average brightness $L_1'$. At the point (255,255), both of the actual brightness and the corrected brightness are 255 (maximum brightness). That is, the gamma correction graph shown in FIG. 8 has a conversion property described below. That is, if the actual brightness is the average brightness $L_i$, it is converted to the moving average brightness $L_1'$. Meanwhile, the actual brightness is not $L_i$, it is converted by means of a linear interpolation.

Figure 9:
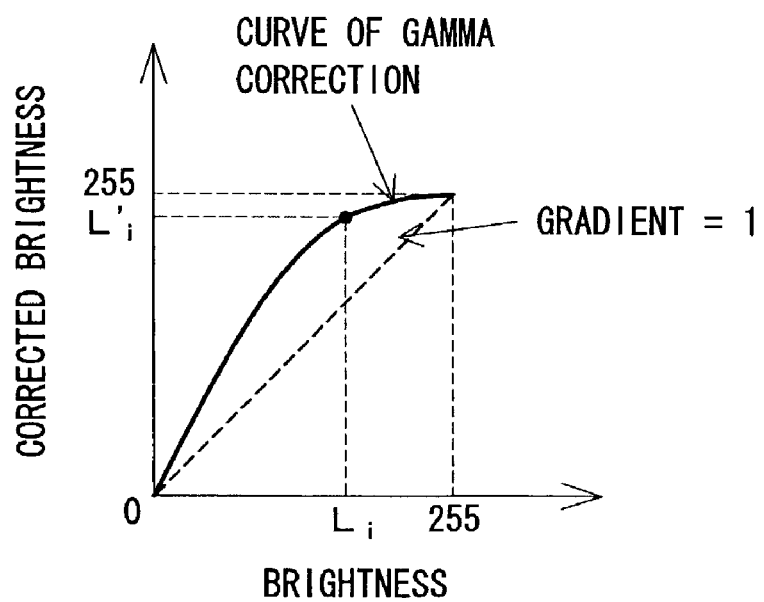
FIG. 9 is a graph showing the characteristics of the gamma correction of another gamma correction table.

Hereupon, as shown in FIG. 9, the change of brightness may be corrected by means of the gamma correction (interpolation) using a gamma correction graph composed of a curve which connects the three points (0,0), ($L_1,L_1'$) and (255,255). In this case, the gamma correction (interpolation) may be more smoothly performed in comparison with the case using the gamma correction graph composed of the polygonal line (straight lines) shown in FIG. 8.

In the correction of brightness according to Embodiment 2, it is not necessarily required to use the moving average (Equation 1) which is used for judging the an unwanted change of brightness in Embodiment 1. Hereupon, in the case that the moving average of Equation 1 is not used, the calculation time may become longer because the reference brightness data (moving average brightness) must be rebuilt. However, if the number of terms of the moving average is used as a parameter, the amount of the correction of brightness can be controlled.

Figure 13A:
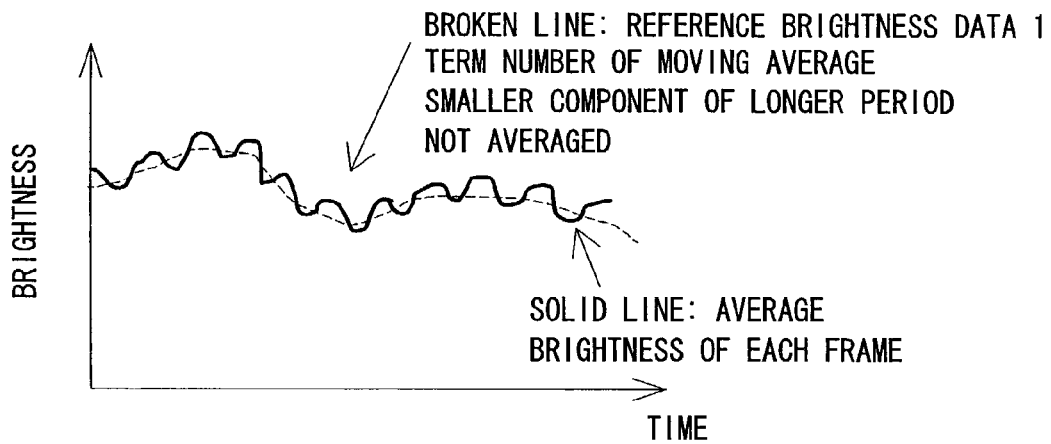
FIGS. 13A and 13B are graphs each of which shows an example of the characteristics of the change of average brightness and moving average brightness in relation to the elapsed time, in the case that the term number of the moving average is small and large, respectively.
Figure 13B:
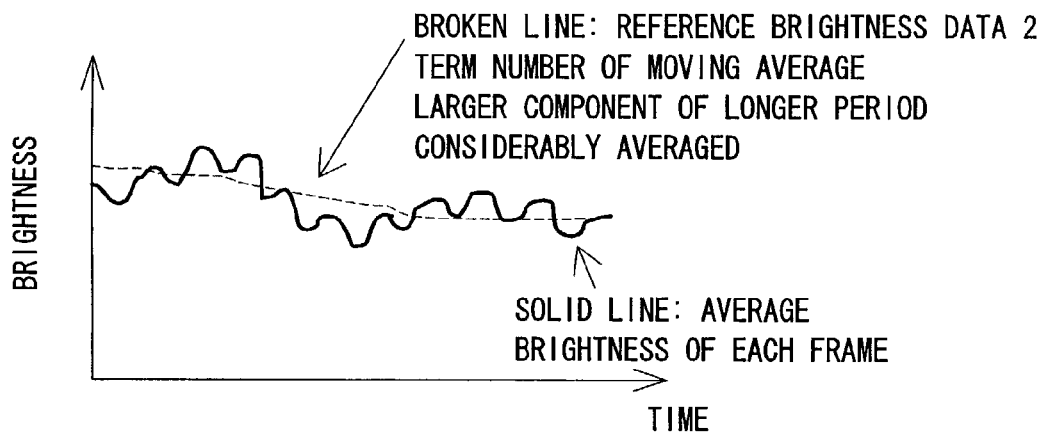

For example, as shown in FIG. 13A, in the case that the number of the terms of the moving average is smaller, the component of longer period in the change of the average brightness (solid line) of each of the frames is not averaged so much. On the other hand, as shown in FIG. 13B, in the case that the number of the terms of the moving average is larger, the component of longer period in the change of the average brightness (solid line) of each of the frames is considerably averaged. As described above, the brightness can be corrected with an arbitrary correction property by changing the number of the terms of the moving average. Hereupon, the correction property may be changed in accordance with the instruction of the user.

As described above, the moving image may be processed using the computer 1 and the recording medium which stores the program for executing the procedure shown by the flowchart in FIG. 2. According to the apparatus for or method of processing the moving image in accordance with Embodiment 2, it can be automatically and effectively prevented or restrained that an unwanted change of brightness such as a flicker occurs in the moving image.

(Embodiment 3)

Hereinafter, Embodiment 3 of the present invention will be described. In Embodiment 3, a reference data of brightness (moving average brightness) is automatically generated and then it is automatically and effectively prevented or restrained that an unwanted change of brightness such as a flicker occurs in the moving image, in accordance with the data processing procedure shown by the flowchart in FIG. 3, using the image processor S shown in FIGS. 14 and 15.

Hereinafter, the data processing procedure according to Embodiment 3 will be described with reference to the flowchart shown in FIG. 3. Hereupon, the fundamental part of the data processing procedure according to Embodiment 3 is common with that of the data processing procedure according to Embodiment 2. Thus, Embodiment 3 is different from Embodiment 2 only in the point that the user defines the time range for performing the data correction and then corrects the brightness. Therefore, in order to avoid duplicated descriptions, characteristics of Embodiment 3, which are different from those of Embodiment 2, will be described hereinafter.

When a moving image is inputted from the image data I/O section 16 to the computer 1, the computer 1 starts to process the moving image data. On that occasion, at first, the user specifies the time range for correcting the data (Step S31). Next, the computer 1 automatically generates reference brightness data (moving average brightness) within the specified time range (Step S32). Hereupon, the procedure for generating the reference brightness data is as same as that of Embodiment 2. Then, as same as the case of Embodiment 2, the computer 1 generates the conversion table for the gamma correction (Step S33), and then corrects the brightness by means of the gamma correction (Step S34).

Figure 10:
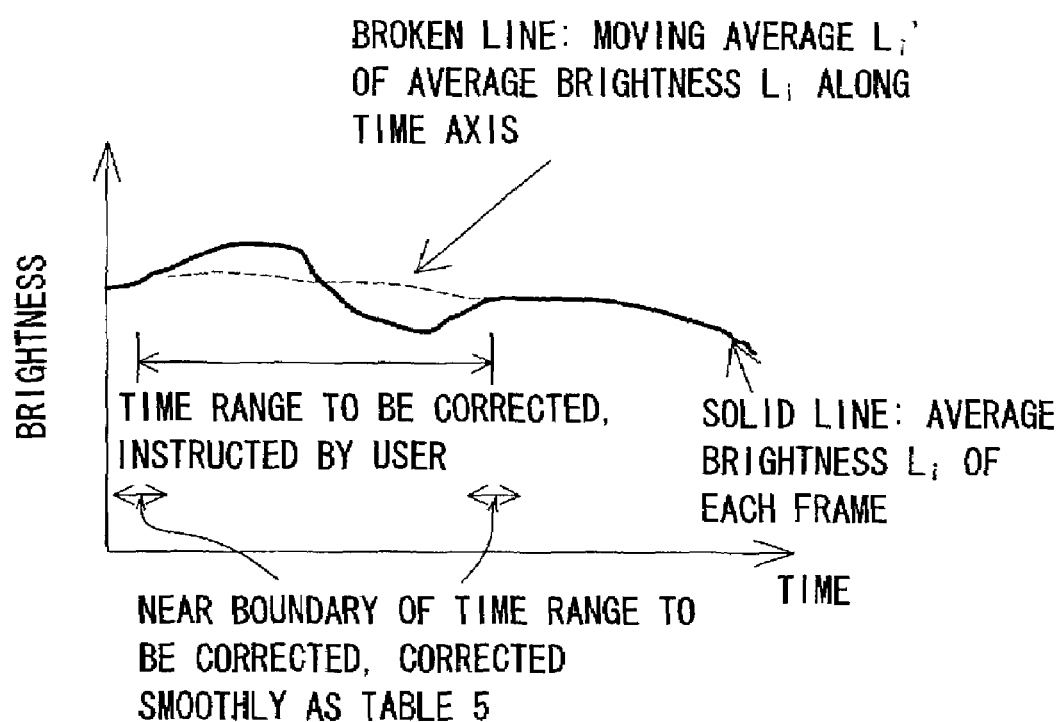
FIG. 10 is a graph showing an example of the characteristics of changes of average brightness and moving average brightness in relation to the elapsed time, in the case that the correction of brightness is performed within a time range specified by a user.

When the brightness flickers due to causes other than the flicker, for example due to an inadequate automatic exposure of a digital camera or the like, in the above-mentioned type of moving image, the brightness slowly changes with the lapse of time. In that case, the correction of brightness would be mostly required only within a specified time range, not within the whole time range. Therefore, in Embodiment 3, as shown in FIG. 10, by specifying the time range desired by the user, the reference brightness data is generated only within the specified time range, and then the brightness is corrected.

In that case, by using the reference brightness data (moving average brightness) of several more frames in addition to those within the time range for correcting the data, the change of brightness with the lapse of time may be smoothed as described below. That is, near the boundary between the time range for correcting the data and other time range, the values obtained by the moving average (moving average brightness) are not simply used without modification as the reference brightness data, but a corrected moving average brightness $Lc_1'$ is calculated using Equation 3 based on the average brightness $L_1$ and moving average brightness $L_1'$ of each of the frames. Thus the corrected moving average brightness $Lc_1'$ is used as the reference brightness data. In Equation 3, "a" is a correction factor (amount of correction) or smoothing factor, which is larger than or equal to 0 and is smaller than or equal to 1.

$$Lc_1' = (1-a) \cdot L_1 + a \cdot L_1' \qquad \text{Equation 3}$$

As shown in Table 5, by gradually (smoothly) changing the correction factor "a" near the boundary from 0 toward 1 or from 1 toward 0, the actual correction of brightness may be smoothed. In Table 5, the frame whose frame number is any one of 7 to 17 is one within the time range specified by the user.

TABLE 5

Procedure of setting correction coefficient

| | Correction coefficient a | |
|---|---|---|
| Frame number i | Smoothed | Not smoothed |
| 1 | 0 | 0 |
| 2 | 0 | 0 |
| 3 | 0.1 | 0 |
| 4 | 0.2 | 0 |
| 5 | 0.3 | 0 |
| 6 | 0.4 | 0 |
| 7* | 0.5 | 1 |
| 8* | 0.6 | 1 |
| 9* | 0.7 | 1 |
| 10* | 0.8 | 1 |

TABLE 5-continued

Procedure of setting correction coefficient

| | Correction coefficient a | |
|---|---|---|
| Frame number i | Smoothed | Not smoothed |
| 11* | 0.9 | 1 |
| 12* | 1 | 1 |
| 13* | 1 | 1 |
| 14* | 1 | 1 |
| 15* | 1 | 1 |
| 16* | 1 | 1 |
| 17* | 1 | 1 |

(Remarks)
*Frame within the specified time range

Figure 3:
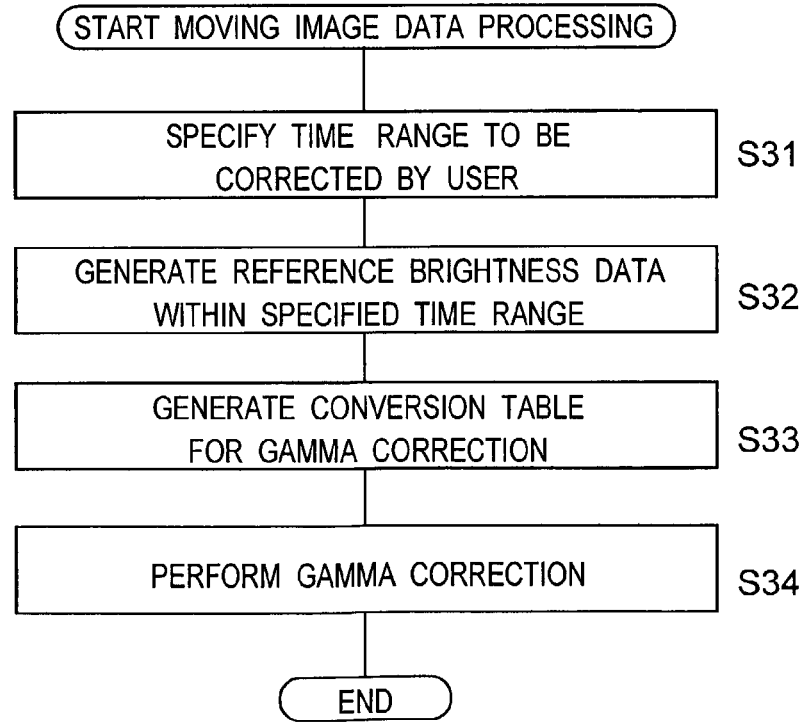
FIG. 3 is a flowchart showing a process for correcting brightness according to Embodiment 3 of the present invention.

As described above, the moving image may be processed using the computer 1 and the recording medium which stores the program for executing the procedure shown by the flowchart in FIG. 3. According to the apparatus for or method of processing the moving image in accordance with Embodiment 3, it can be automatically and effectively prevented or restrained that an unwanted change of brightness such as a flicker occurs in the moving image.

(Embodiment 4)

Hereinafter, Embodiment 4 of the present invention will be described. In Embodiment 4, a reference data of brightness is automatically generated and then it is automatically and effectively prevented or restrained that an unwanted change of brightness occurs in the moving image, in accordance with the data processing procedure shown by the flowchart in FIG. 4, using the image processor S shown in FIGS. 14 and 15.

Hereinafter, the data processing procedure according to Embodiment 4 will be described with reference to the flowchart shown in FIG. 4. Hereupon, the fundamental part of the data processing procedure according to Embodiment 4 is common with that of the data processing procedure according to Embodiment 2. Thus, Embodiment 4 is different from Embodiment 2 only in the point that an unwanted change of brightness having plural kinds of periodicity is corrected by a plurality of corrections. Therefore, in order to avoid duplicated descriptions, characteristics of Embodiment 4, which are different from those of Embodiment 2, will be described hereinafter.

Figure 4:
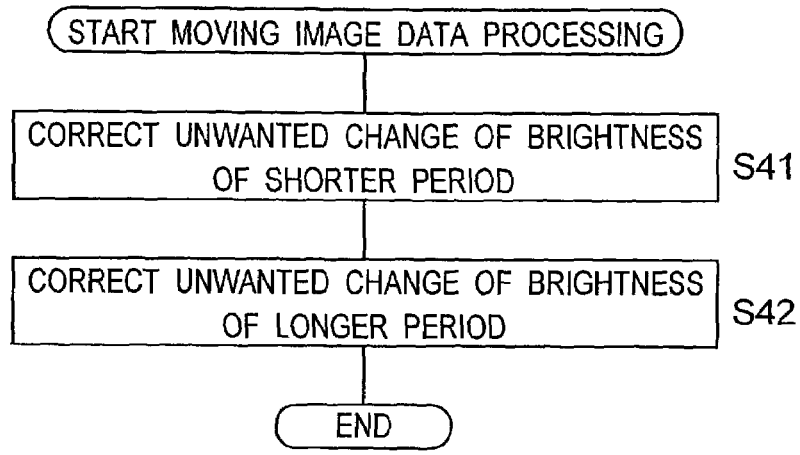
FIG. 4 is a flowchart showing a process for correcting brightness according to Embodiment 4 of the present invention.

As shown in FIG. 4, in Embodiment 4, at first, the computer 1 corrects the unwanted change of brightness of shorter period (Step S41), and then corrects the unwanted change of brightness of longer period (Step S42). The other points are as same as those of Embodiment 2.

Figure 11A:
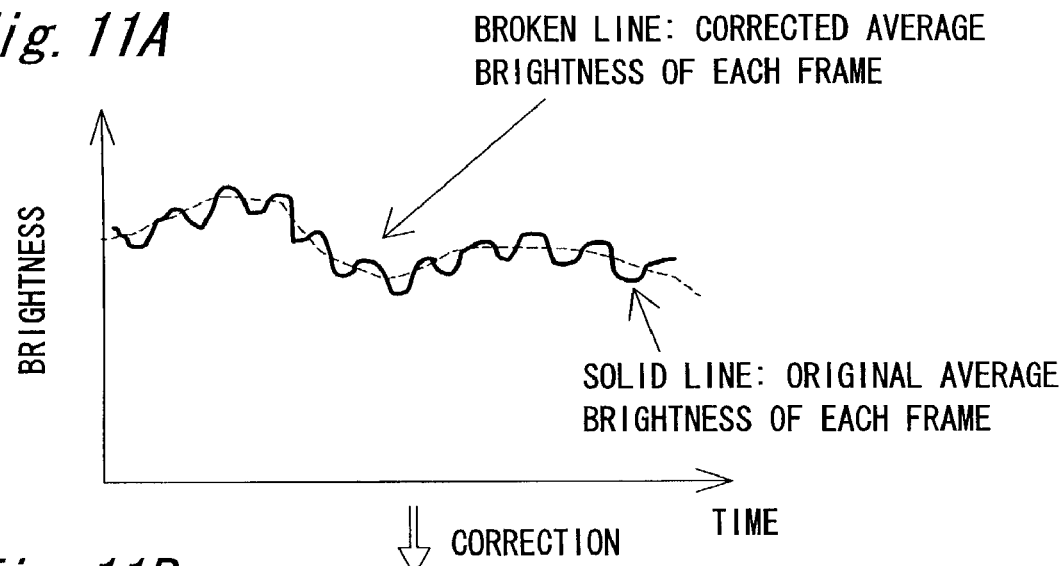
FIGS. 11A to 11C are graphs each of which shows an example of the characteristics of the change of average brightness and moving average brightness in relation to the elapsed time, in the case that the correction of brightness is performed twice.
Figure 11B:
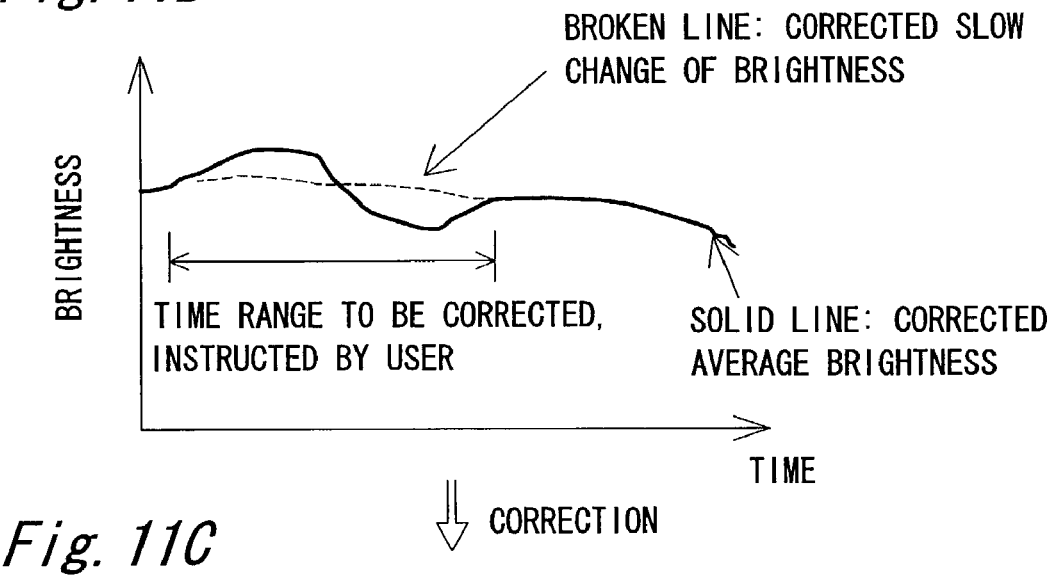
Figure 11C:
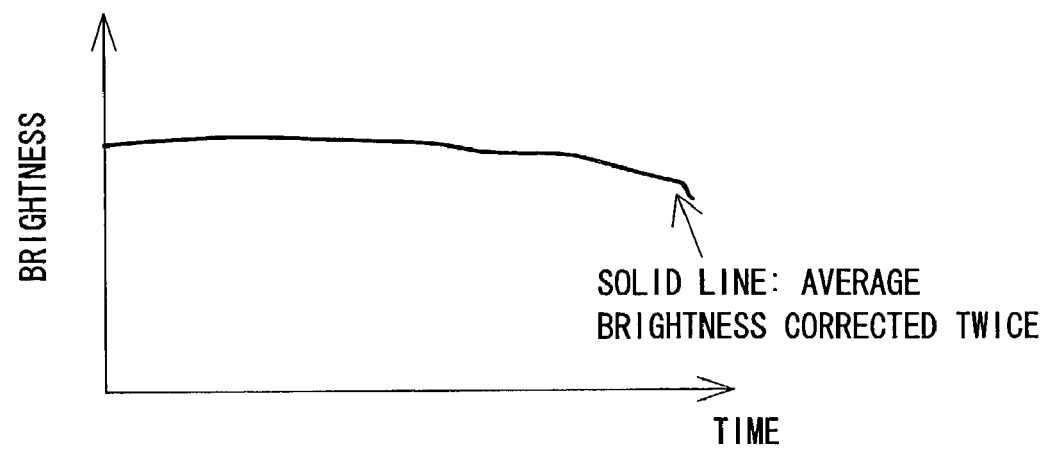

For example, even if the unwanted change of brightness of shorter period due to the flicker is corrected by the procedure according to Embodiment 1 or 2, it is probable that the unwanted change of brightness of longer period due to an inadequate automatic exposure or the like, which changes in slow time, may still remain (see the uppermost graph in FIG. 11). However, as shown in FIG. 11, even in the above-mentioned case, the moving image can be completely corrected by correcting the change of brightness more than once according to the procedure in Steps S41 and S42 of the flowchart shown in FIG. 4.

As described above, the moving image may be processed using the computer 1 and the recording medium which stores the program for executing the procedure shown by the flowchart in FIG. 4. According to the apparatus for or method of processing the moving image in accordance with Embodiment 4, it can be automatically and effectively prevented or restrained that an unwanted change of brightness occurs in the moving image even if the unwanted change of brightness has plural kinds of periodicity.

(Embodiment 5)

Hereinafter, Embodiment 5 of the present invention will be described. In Embodiment 5, a reference data of brightness is automatically generated and then it is automatically judged whether an unwanted change of brightness is present, or the condition of the change is judged, in accordance with the data processing procedure shown by the flowchart in FIG. 5, using the image processor S shown in FIGS. 14 and 15.

Hereinafter, the data processing procedure according to Embodiment 5 will be described with reference to the flowchart shown in FIG. 5. Hereupon, the fundamental part of the data processing procedure according to Embodiment 5 is common with that of the data processing procedure according to Embodiment 1. Thus, Embodiment 5 is different from Embodiment 1 only in the point that plural kinds of reference brightness data are used so that the accuracy of the above-mentioned judgement is improved (raised). Therefore, in order to avoid duplicated descriptions, characteristics of Embodiment 5, which are different from those of Embodiment 1, will be described hereinafter.

Figure 5:
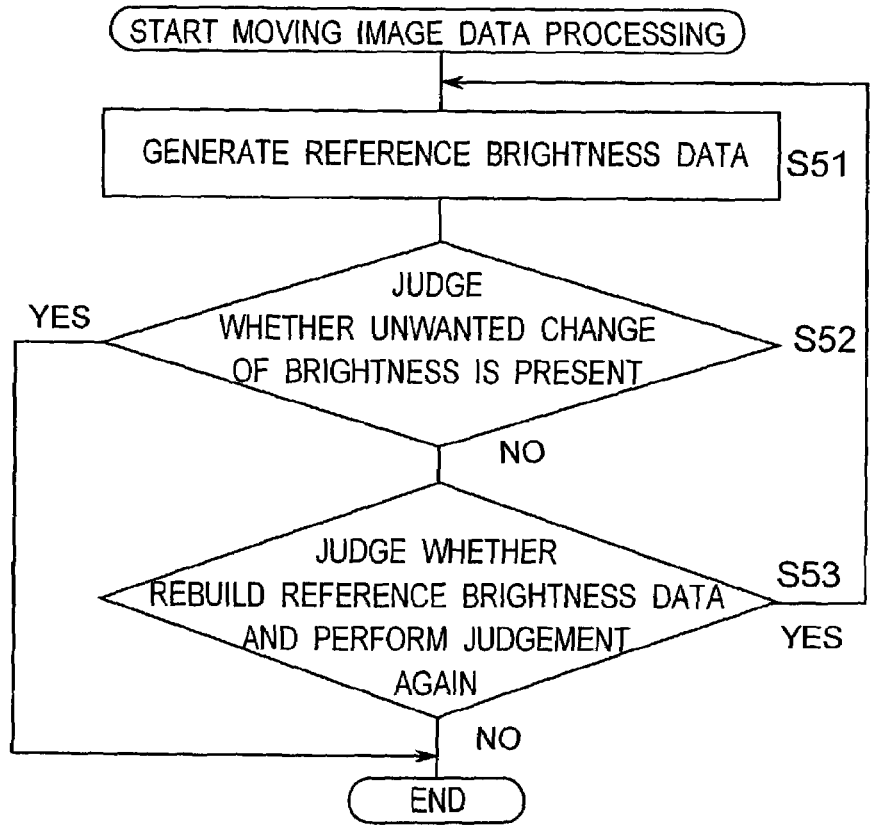
FIG. 5 is a flowchart showing a process for judging an unwanted change of brightness according to Embodiment 5 of the present invention.

As shown in FIG. 5, in Embodiment 5, at first, the computer 1 automatically generates the reference brightness data (moving average brightness) in accordance with the procedure as same as that of Embodiment 1 (Step S51). Next, the computer 1 judges whether an unwanted change of brightness is present (Step S52). If the unwanted change of brightness is not present, it is judged whether the reference brightness data should be rebuilt and then it should be judged again whether the unwanted change of brightness is present (Step S53). In the case that the judgement is performed again, Steps S51 to S53 are repeatedly executed. Hereupon, if it is judged that the unwanted change of brightness is present in Step S52, or if the judgement is not repeatedly executed when it is judged that the unwanted change of brightness is not present in Step S52, the present data processing routine is finished.

Figure 12A:
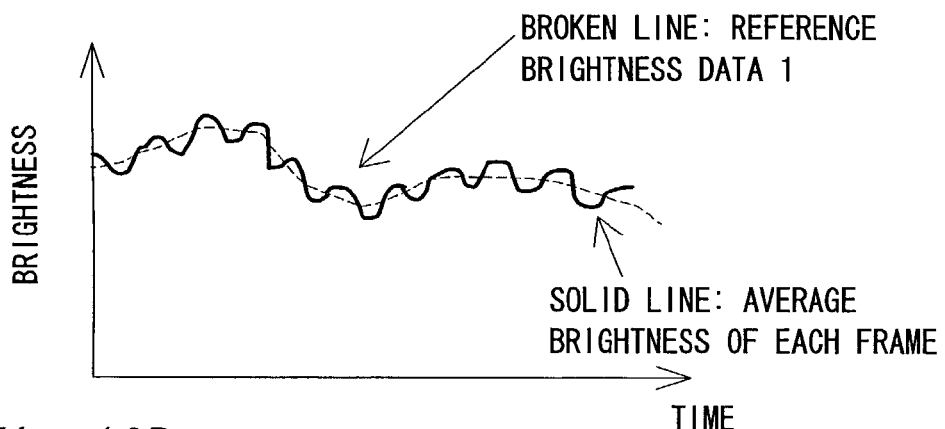
FIGS. 12A to 12C are graphs each of which shows an example of the characteristics of the change of average brightness and moving average brightness in relation to the elapsed time, in the case that the term number of each moving average is different to one another.
Figure 12B:
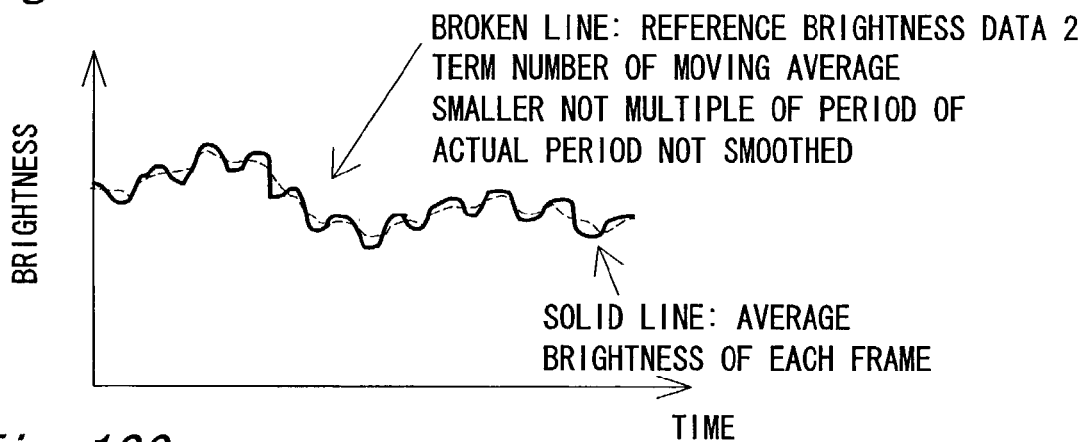
Figure 12C:
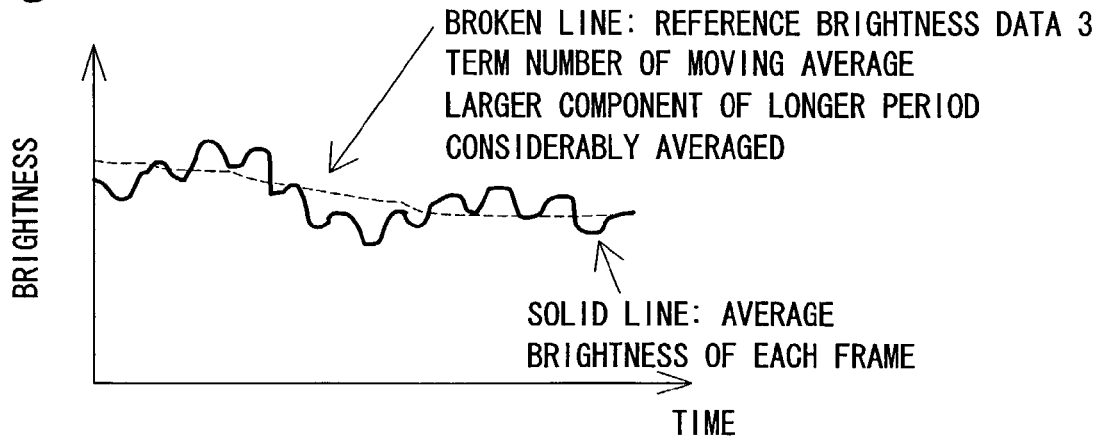

When the unwanted change of brightness of shorter period occurs, it is probable that the number of the terms of the moving average affects the accuracy of the judgement. For example, as to a moving image with a flicker which occurs due to interaction of the illumination of 50 Hz and the frame rate of 15 fps, implicit change of brightness may has periodicity at every three frames. In consequence, for example, as shown in FIG. 12A, the accuracy may be improved if the number of terms is set to a multiple of 3. On the other hand, as shown in FIG. 12B, if the moving average is calculated by setting the number of the terms to 4 when the periodicity which appears at every three frames is present, the periodicity may remains a little. As shown in FIG. 12C, the number of the terms of the moving average is larger, the component of longer period may be considerably averaged.

The larger the number of the terms of the moving average becomes, the more the component of longer period in the change of brightness is averaged or smoothed. Therefore, in response to the length of the period of the original moving image, the way of calculating the moving average may affect the accuracy of the judgement. Accordingly, in fact, it is probable that the accuracy of the judgement changes in response to the way of generating the reference brightness data. In consequence, even if it is judged that a flicker is not present based on a certain reference brightness data, it may be judged that the flicker is present if another reference brightness data is used. However, when the judgement is performed in accordance with the procedure shown by the flowchart in FIG. 5, the judgement is performed using a plurality of reference brightness data. In consequence, the above-mentioned flicker is never passed by so that the accuracy of the judgement may be improved.

Thus, the moving image may be processed using the computer 1 and the recording medium which stores the program for executing the procedure shown by the flowchart in FIG. 5. According to the apparatus for or method of processing the moving image in accordance with Embodiment 5, it can be automatically and precisely judged whether an unwanted change of brightness is present in the moving image or the condition of the change can be automatically and precisely judged.

In each of Embodiments 1 to 5, as described above, it is judged whether an unwanted change of brightness is present, the condition of the change is judged, or the brightness is corrected. However, the procedure for judging the unwanted change of brightness or for correcting the brightness according to any one of Embodiments 1 to 5 can be applied to the procedure for judging the unwanted change of chroma or for correcting the chroma, without substantial change. Therefore, if "brightness" is replaced with "chroma" in each of Embodiments 1 to 5 (For example, "reference brightness data" may be replaced with "reference chroma data".), it can be precisely judged whether an unwanted change of chroma is present, the condition of the change can be precisely judged, or the chroma can be precisely corrected.

In addition, the procedure for judging the unwanted change of brightness or for correcting the brightness according to any one of Embodiments 1 to 5 can be applied to the procedure for judging the unwanted changes of both of the brightness and chroma or for correcting both of the brightness and chroma, without substantial change. For example, after it is judged that the unwanted change of brightness is present based on the reference brightness data and then the brightness is corrected, in accordance with the data processing procedure according to Embodiment 1 or 2, the following process may be performed. That is, the reference chroma data is generated. Then, it is judged whether an unwanted change of chroma is present or the condition of the change is judged. Further, if necessary, both of the brightness and chroma may be corrected by correcting the chroma. The judgement of the change of brightness or the correction of the brightness may be performed after the judgement of the change of chroma or the correction of the chroma. Meanwhile, only either one of the reference brightness data and reference chroma data may be used when the changes of brightness and chroma are judged.

As described above, according to Embodiments 1 to 5 or their changes or modifications, all of the judgements or corrections are automatically performed. Therefore, the user can obtain good results as to the judgements or corrections almost without working. Alternatively, the computer 1 may automatically perform the corrections when the user instructs the computer 1 to correct the brightness or chroma, without performing the automatic judgements of the unwanted change of brightness or chroma.

Meanwhile, a weighted moving average, which can be calculated by means of Equation 4 described below may be used as the moving average.

$$L_i' = \{L_{i-1} + 2L_i + L_{i+1}\}/4 \quad \text{Equation 4}$$

In that case, reference brightness data, in which the original change of brightness remains a little, can be generated. If the original change of brightness or chroma remains a little, for example, for the change of brightness or chroma of longer period when the brightness or chroma is corrected, an excessive correction is prevented so that preferable results may be obtained.

As described above, according to the present invention, the judgement of the unwanted change of brightness or chroma, or the correction of the brightness or chroma can be precisely performed using arbitrary frames including future frames of the frames to be corrected, utilizing the characteristics of the non-linear correction. Further, it is possible to respond to the unwanted change of brightness or chroma in the moving image, which has plural kinds of periodicity different from one another. In addition, if the present invention is applied to judge whether the change of brightness or chroma such as a flicker is present and then the data is corrected only in the case that the flicker is present, the correction may be fast and precisely performed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A program product using a program embodied on a computer readable medium for processing a moving image, the program carrying out the steps comprising:

inputting the moving image;

calculating an average brightness or an average chroma of each frame of the moving image;

calculating a moving average along a time axis about the average brightness or the average chroma to generate a moving average brightness or a moving average chroma, respectively;

calculating a difference between the average brightness and the moving average brightness or the difference between the average chroma and the moving average chroma, to generate a brightness difference or a chroma difference, respectively; and judging whether the moving image includes an unwanted change of brightness or chroma based on a periodicity of the brightness difference or the chroma difference, respectively.

2. A program product using a program embodied on a computer readable medium for processing a moving image, the program carrying out the steps comprising:

inputting the moving image;

inputting a time range for correcting the moving image;

calculating an average brightness or an average chroma of each frame of the moving image;

calculating a moving average in the time range about the average brightness or the average chroma to generate a moving average brightness or a moving average chroma, respectively; and correcting an unwanted change of brightness or chroma in the time range based on the moving average brightness or the moving average chroma, respectively.

3. The program product of claim 2, wherein a time range for calculating the moving average brightness or the moving average chroma is longer than a time range for correcting the moving image.

4. The program product of claim 3, the program further carrying out the step comprising multiplying the average brightness or the average chroma by a correction coefficient when the moving average brightness or the moving average chroma is calculated, respectively.

5. A program product using a program embodied on a computer readable medium for processing a moving image, the program carrying out the steps comprising:
   inputting the moving image;
   generating brightness or chroma reference data based on image data about brightness or chroma of the moving image; and
   performing data correction for the moving image when the image data indicates a predetermined change of brightness or chroma in relation to the reference data,
   wherein the data correction reduces the change of brightness or chroma, and
   wherein, when a change of brightness or chroma of the image data has a plurality of period changing patterns, data correction is performed for each of the period changing patterns, starting with a pattern having the shortest period.

6. A recording medium storing a program for processing a moving image, the program comprising the steps of:
   inputting the moving image;
   calculating an average brightness or an average chroma of each frame of the moving image;
   calculating a moving average along a time axis about the average brightness or the average chroma to generate a moving average brightness or a moving average chroma, respectively;
   calculating a difference between the average brightness and the moving average brightness or the difference between the average chroma and the moving average chroma, to generate a brightness difference or a chroma difference, respectively; and
   judging whether the moving image includes an unwanted change of brightness or chroma based on a periodicity of the brightness difference or the chroma difference, respectively.

7. A recording medium storing a program for processing a moving image, the program comprising the steps of:
   inputting the moving image;
   inputting a time range for correcting the moving image;
   calculating an average brightness or an average chroma of each frame of the moving image;
   calculating a moving average in the time range about the average brightness or the average chroma to generate a moving average brightness or a moving average chroma, respectively; and
   correcting an unwanted change of brightness or chroma in the time range based on the moving average brightness or the moving average chroma, respectively.

8. A method of processing a moving image, comprising the steps of:
   inputting the moving image;
   calculating an average brightness or an average chroma of each frame of the moving image;
   calculating a moving average along a time axis about the average brightness or the average chroma to generate a moving average brightness or a moving average chroma, respectively;
   calculating a difference between the average brightness and the moving average brightness or the difference between the average chroma and the moving average chroma, to generate a brightness difference or a chroma difference, respectively; and
   judging whether the moving image includes an unwanted change of brightness or chroma based on a periodicity of the brightness difference or the chroma difference, respectively.

9. A method of processing a moving image, comprising the steps of:
   inputting the moving image;
   inputting a time range for correcting the moving image;
   calculating an average brightness or an average chroma of each frame of the moving image;
   calculating a moving average in the time range about the average brightness or the average chroma to generate a moving average brightness or a moving average chroma, respectively; and
   correcting an unwanted change of brightness or chroma in the time range based on the moving average brightness or the moving average chroma, respectively.

10. An apparatus for processing a moving image, comprising:
    an input device for inputting the moving image;
    a first calculator for calculating an average brightness or an average chroma of each frame of the moving image;
    a second calculator for calculating a moving average along a time axis about the average brightness or the average chroma to generate a moving average brightness or a moving average chroma, respectively;
    a third calculator for calculating a difference between the average brightness and the moving average brightness or the difference between the average chroma and the moving average chroma, to generate a brightness difference or a chroma difference, respectively; and
    a judging device for judging whether the moving image includes an unwanted change of brightness or chroma based on a periodicity of the brightness difference or the chroma difference, respectively.

11. An apparatus for processing a moving image, comprising:
    an input device inputting the moving image;
    a second input device for inputting a time range for correcting the moving image;
    a first calculator for calculating an average brightness or an average chroma of each frame of the moving image;
    a second calculator for calculating a moving average in the time range about the average brightness or the average chroma to generate a moving average brightness or a moving average chroma, respectively; and
    a corrector for correcting an unwanted change of brightness or chroma in the time range based on the moving average brightness or the moving average chroma, respectively.

* * * * *